(12) United States Patent
Tanaka

(10) Patent No.: US 9,076,031 B2
(45) Date of Patent: Jul. 7, 2015

(54) IMAGE CAPTURE APPARATUS, CONTROL METHOD OF IMAGE CAPTURE APPARATUS, AND RECORDING MEDIUM

(71) Applicant: CANON KABUSHIKI KAISHA, Tokyo (JP)

(72) Inventor: Shuya Tanaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 251 days.

(21) Appl. No.: 13/736,653

(22) Filed: Jan. 8, 2013

(65) Prior Publication Data

US 2013/0182919 A1 Jul. 18, 2013

(30) Foreign Application Priority Data

Jan. 13, 2012 (JP) .................................. 2012-005658
Dec. 17, 2012 (JP) .................................. 2012-275105

(51) Int. Cl.
*G06K 9/00* (2006.01)
(52) U.S. Cl.
CPC .................................. *G06K 9/00288* (2013.01)
(58) Field of Classification Search
None
See application file for complete search history.

(56) References Cited

U.S. PATENT DOCUMENTS

| | | | | |
|---|---|---|---|---|
| 7,885,435 B2* | 2/2011 | Shah et al. | .................... | 382/118 |
| 8,023,702 B2* | 9/2011 | Momosaki et al. | ........... | 382/118 |
| 8,447,769 B1* | 5/2013 | Paris et al. | .................... | 707/758 |
| 8,487,956 B2* | 7/2013 | Morita et al. | ................. | 345/619 |
| 8,688,782 B1* | 4/2014 | Lin et al. | ........................ | 709/204 |
| 8,731,301 B1* | 5/2014 | Bushman et al. | ............. | 382/189 |
| 8,854,397 B2* | 10/2014 | Xie et al. | ....................... | 345/660 |
| 2011/0013810 A1* | 1/2011 | Engstrom et al. | ............. | 382/118 |

FOREIGN PATENT DOCUMENTS

| | | |
|---|---|---|
| JP | 06-259534 | 9/1994 |
| JP | 2008-245007 | 10/2008 |

\* cited by examiner

*Primary Examiner* — Daniel Mariam
(74) *Attorney, Agent, or Firm* — Cowan, Liebowitz & Latman, P.C.

(57) ABSTRACT

An image capture apparatus include transmission unit for transmitting first feature data concerning a face region included in an image captured by an image sensor to an external apparatus, reception unit for receiving a matching result between the first feature data and second feature data concerning a sub object from the external apparatus, storage unit for storing third feature data concerning a main object in a predetermined storage area in advance, matching unit for matching the first feature data with the third feature data and display unit for identifiably displaying, on a display device, the face region recognized as the sub object in the matching result received by the reception unit and the face region recognized as the main object in the matching result obtained by the matching unit.

7 Claims, 12 Drawing Sheets

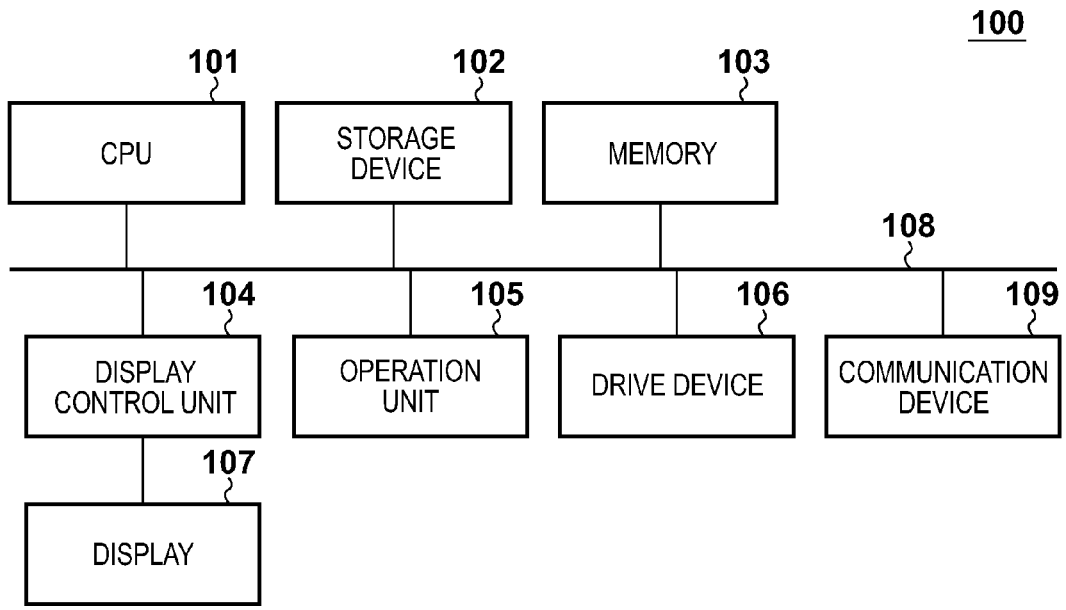
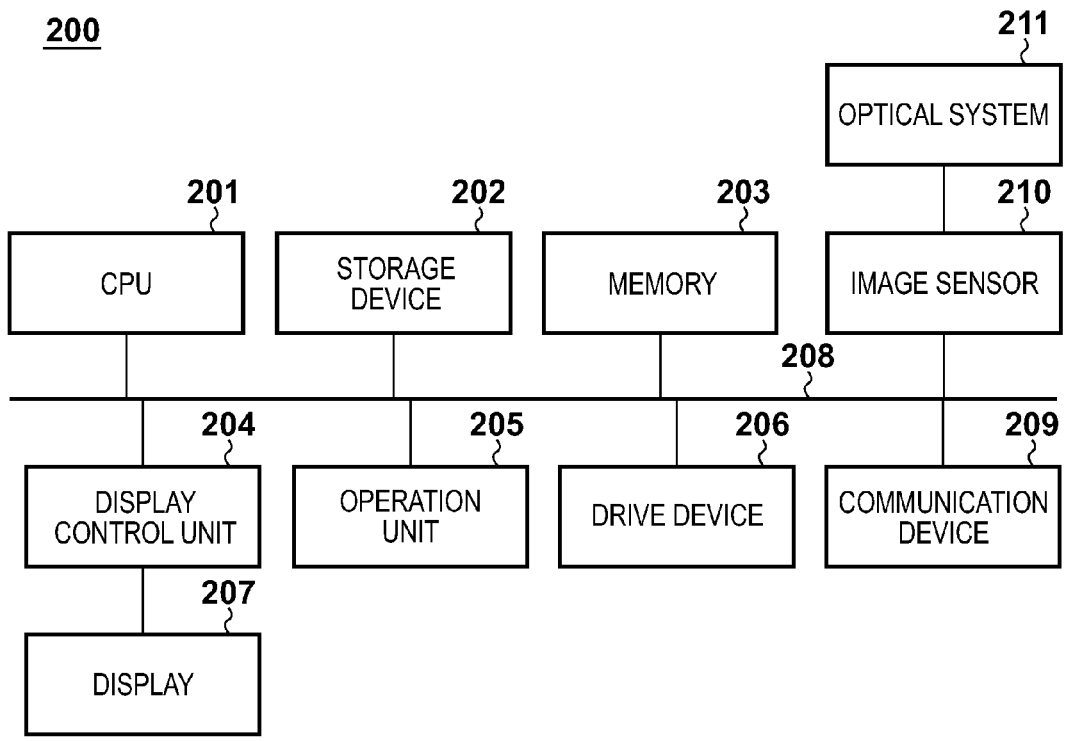

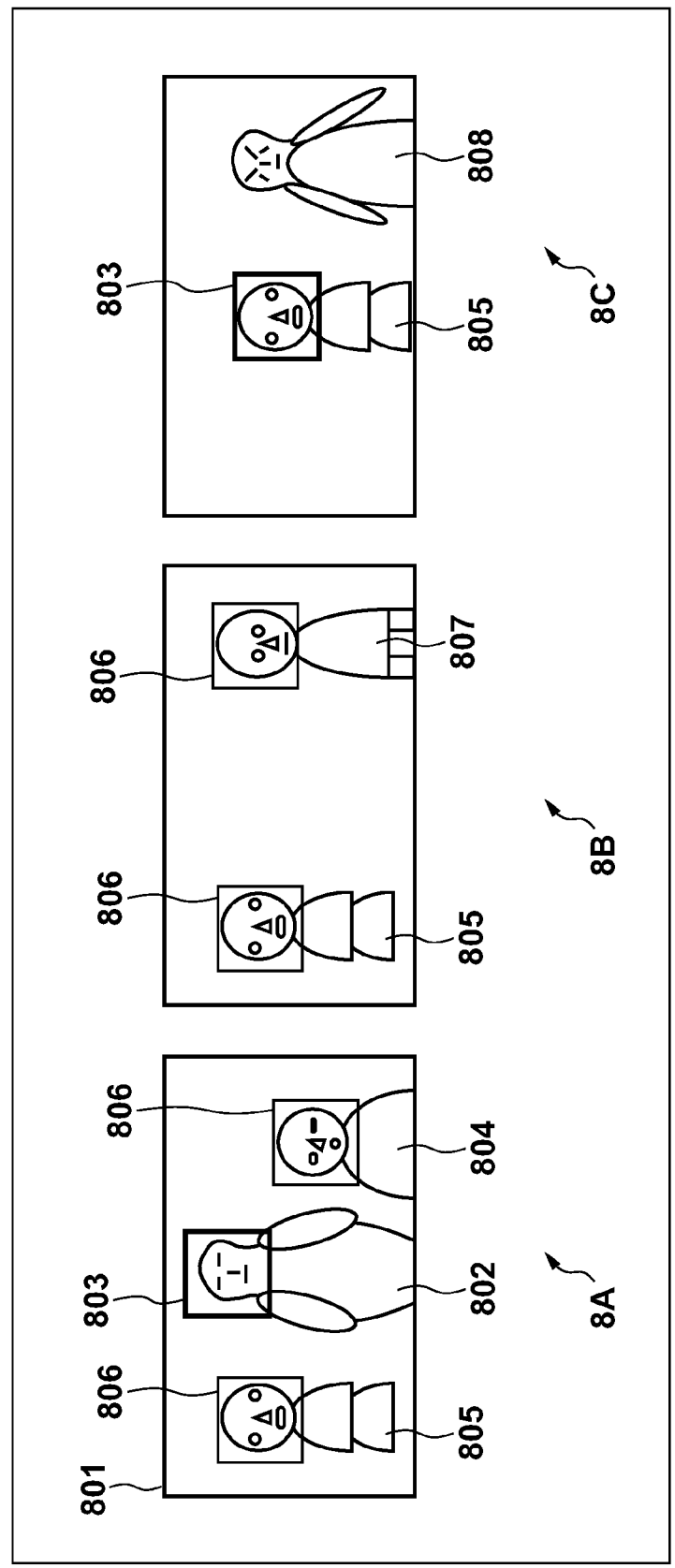

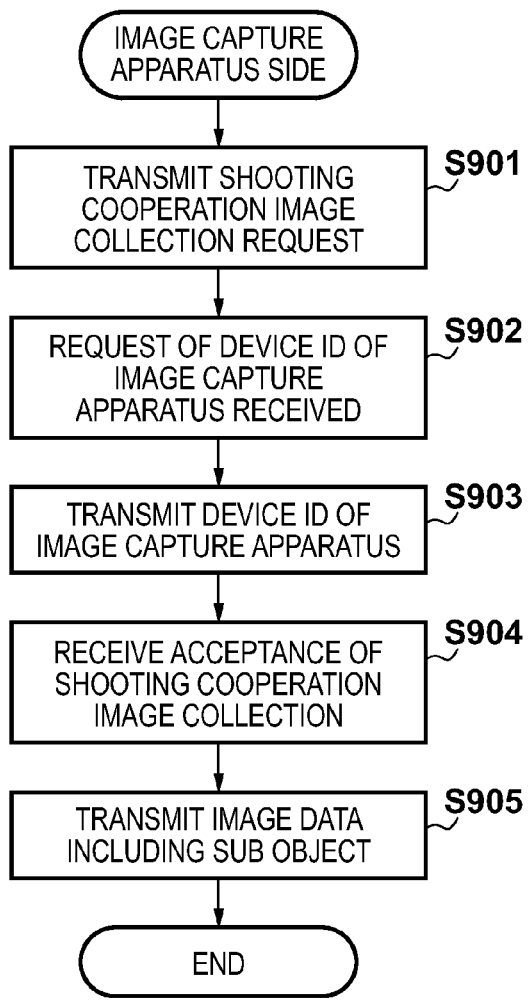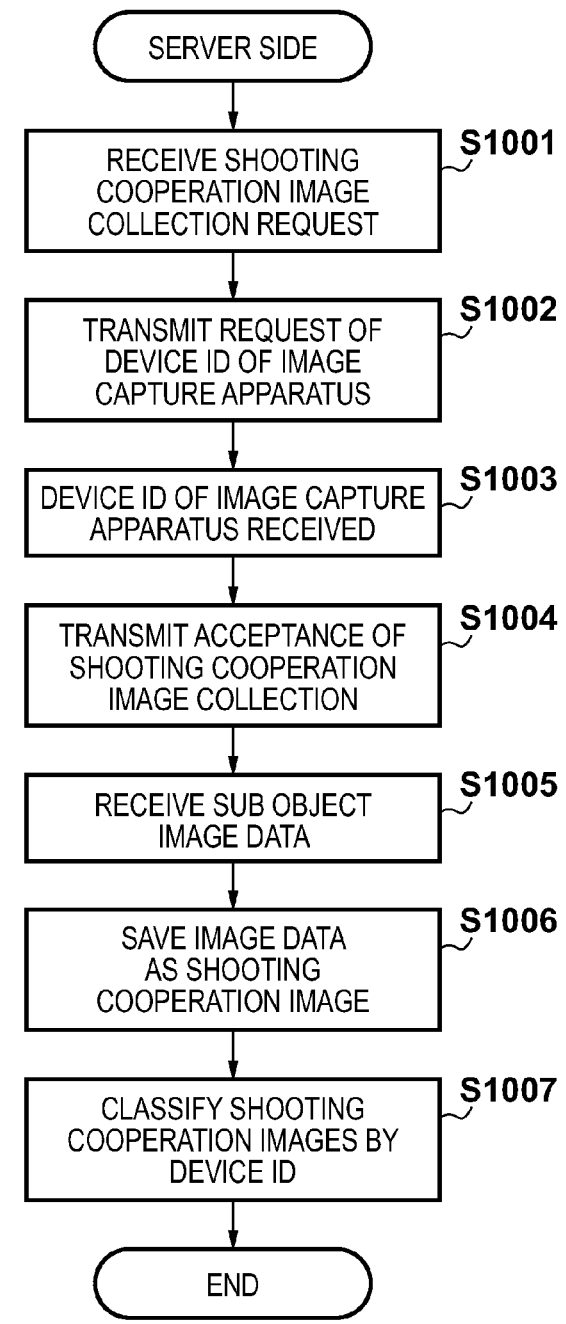
FIG. 9 / FIG. 10

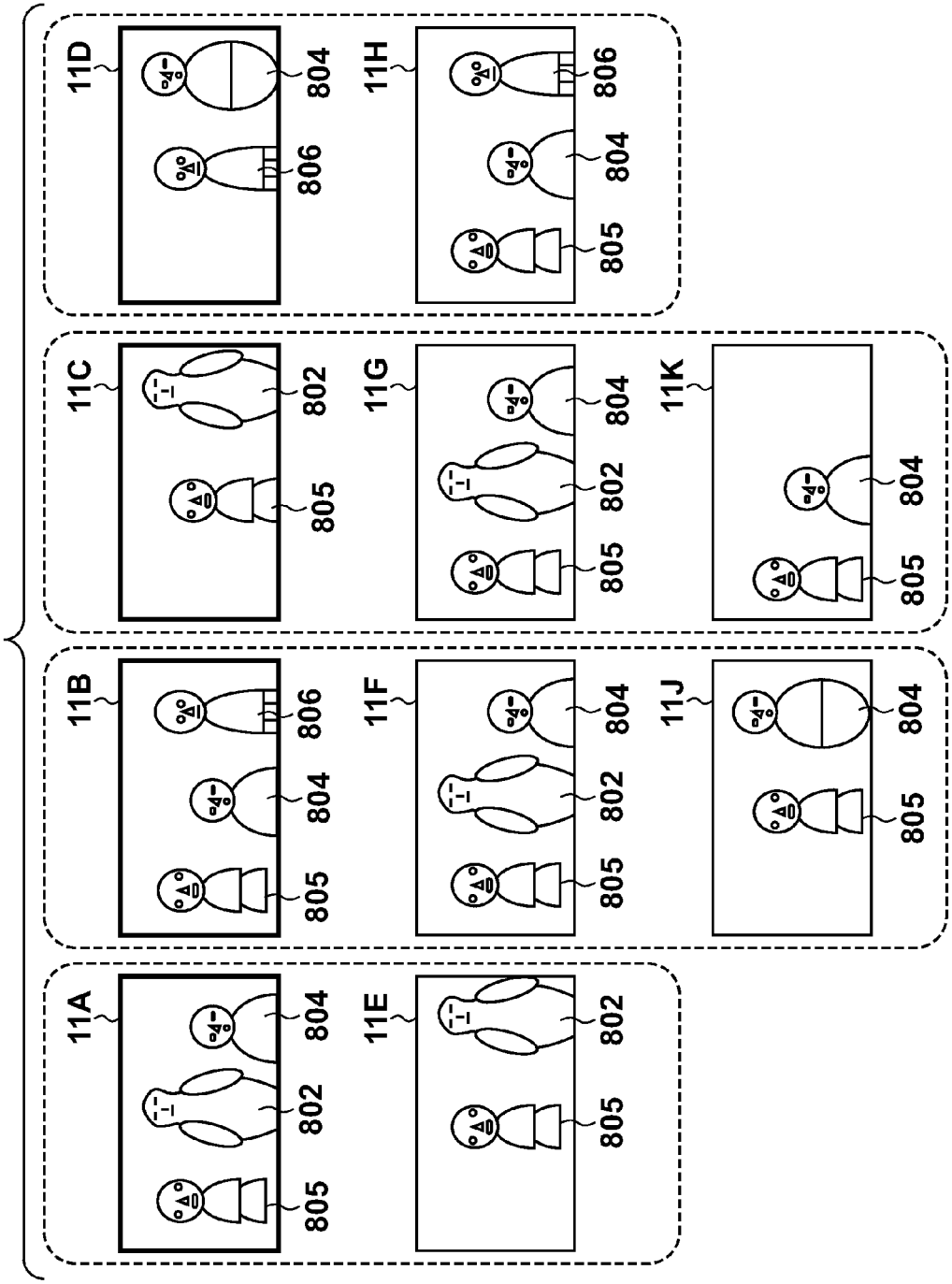

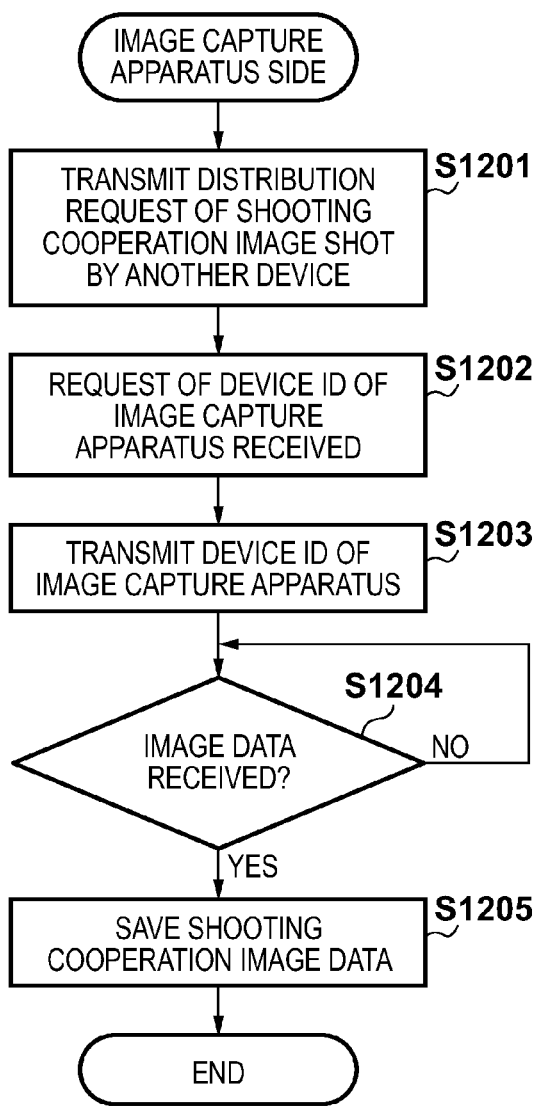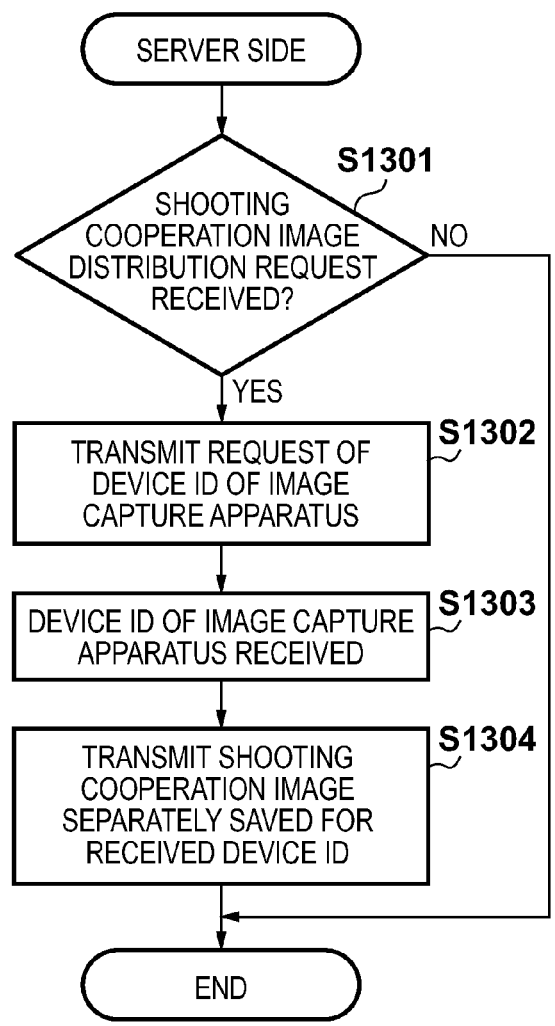

IMAGE CAPTURE APPARATUS, CONTROL METHOD OF IMAGE CAPTURE APPARATUS, AND RECORDING MEDIUM

BACKGROUND OF THE INVENTION

1. Field of the Invention

The present invention relates to an image capture apparatus, a control method of an image capture apparatus, and a recording medium and, more particularly, to a technique using individual identification information of an object.

2. Description of the Related Art

Techniques of detecting a person's face from an image have already been widely known. The recent progress of image processing technologies has also driven a technique of recognizing a person into practical use (see Japanese Patent Laid-Open No. 6-259534). Image capture apparatuses using a person recognition function are also commercially available. Japanese Patent Laid-Open No. 2008-245007 describes registering the features of person's faces and the priority orders of persons in an electronic camera, and upon detecting a plurality of registered persons at the time of shooting, performing shooting by applying shooting settings corresponding to the person of the highest priority order.

In the conventional image capture apparatus having the person recognition function, however, the function is used to only discriminate the persons registered in the apparatus, and the application range is limited. For example, if person recognition can be done using externally acquired feature data of persons, even an unknown person can be specified from a captured image. However, such an application has not been assumed.

For example, at an event such as an athletic meet the user's child takes part in, taking pictures of friends of the child as well would make everybody happy. However, if the user is hardly acquainted with the friends on a daily basis, it is actually difficult to appropriately take pictures (that is, take pictures including the friends as the main object) even in a situation where the shooting is possible.

SUMMARY OF THE INVENTION

The present invention provides an apparatus that more effectively uses a person recognition function.

The first aspect of the present invention provides an image capture apparatus comprising transmission unit for transmitting first feature data concerning a face region included in an image captured by an image sensor to an external apparatus, reception unit for receiving a matching result between the first feature data and second feature data concerning a sub object from the external apparatus, storage unit for storing third feature data concerning a main object in a predetermined storage area in advance, matching unit for matching the first feature data with the third feature data and display unit for identifiably displaying, on a display device, the face region recognized as the sub object in the matching result received by the reception unit and the face region recognized as the main object in the matching result obtained by the matching unit.

The second aspect of the present invention provides a control method of an image capture apparatus, comprising transmitting, by the image capture apparatus, first feature data concerning a face region included in a captured image to an external apparatus, receiving, by the image capture apparatus, a matching result between the first feature data and second feature data concerning a sub object from the external apparatus, storing, by the image capture apparatus, third feature data concerning a main object in a predetermined storage area in advance, matching, by the image capture apparatus, the first feature data with the third feature data and identifiably displaying, by the image capture apparatus, the face region recognized as the sub object and the face region recognized as the main object.

Further features of the present invention will become apparent from the following description of exemplary embodiments with reference to the attached drawings.

BRIEF DESCRIPTION OF THE DRAWINGS

FIG. 1 is a block diagram of a server to which the present invention is applied;

FIG. 2 is a block diagram of an image capture apparatus to which the present invention is applied;

FIG. 8 is a view showing display examples of the display at the time of shooting by a different image capture apparatus;

FIG. 9 is a flowchart of processing of providing an image requested to shoot;

FIG. 10 is a flowchart of processing of providing an image requested to shoot;

FIG. 11 is a view showing examples of images shot by a different apparatus;

FIG. 12 is a flowchart of processing of receiving an image requested to shoot;

FIG. 13 is a flowchart of processing of receiving an image requested to shoot.

DESCRIPTION OF THE EMBODIMENTS

First Embodiment

Figure 3:
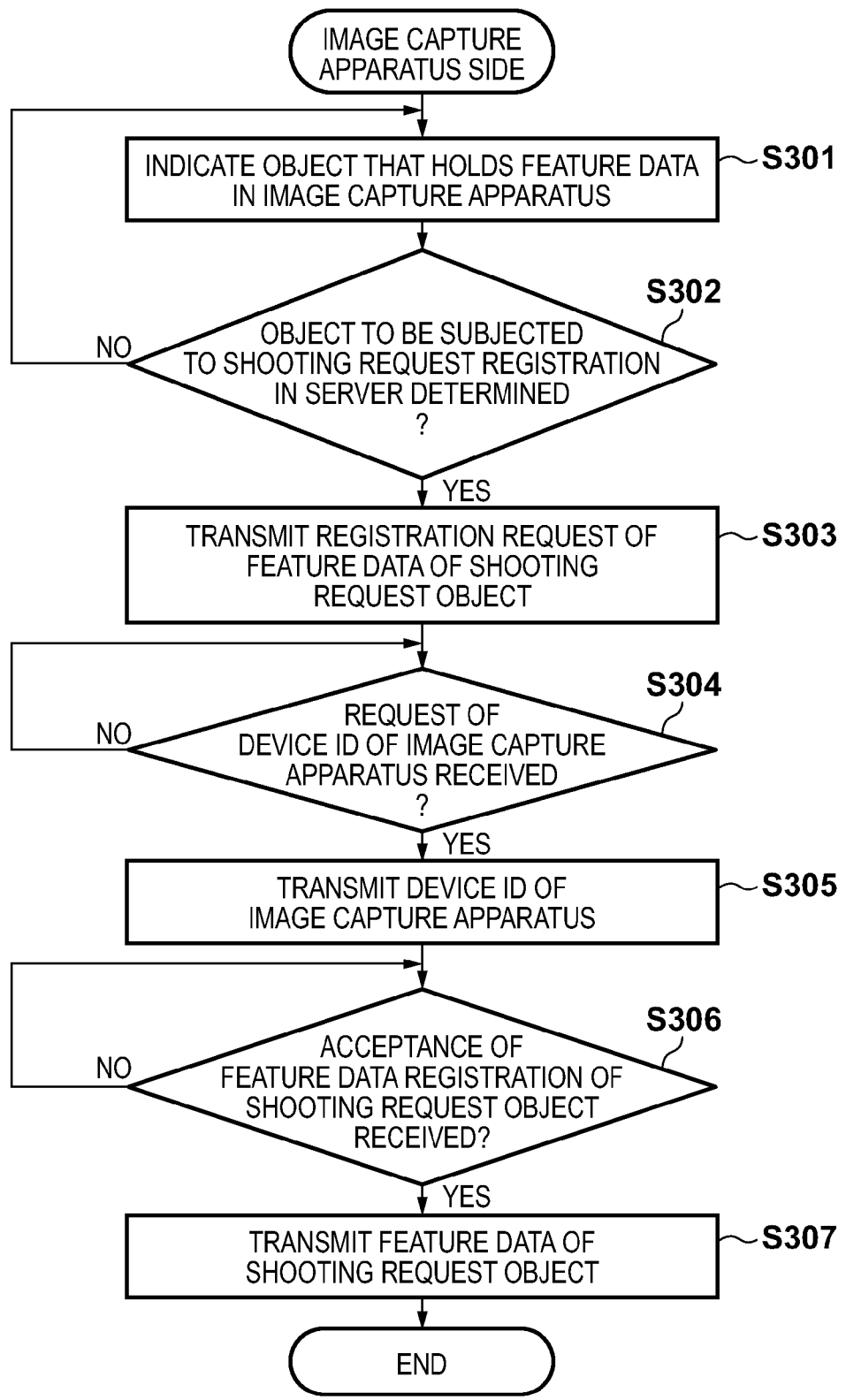
FIG. 3 is a flowchart showing object registration processing.

An exemplary embodiment of the present invention will now be described in detail with reference to the accompanying drawings.

FIG. 1 is a block diagram showing an example of the arrangement of a server 100 that is an example of an external apparatus capable to communicating with an image capture apparatus according to the present invention. Referring to FIG. 1, a CPU 101, a storage device 102, a memory 103, a display control unit 104, an operation unit 105, a drive device 106, and a communication device 109 are connected to an internal bus 108. The respective units connected to the internal bus 108 can exchange data with each other via the internal bus 108.

The storage device 102 stores image data, other data, and various kinds of programs used by the CPU 101 to operate. The memory 103 is formed from, for example, a RAM. The CPU 101 that executes display control, calculations, and the like controls the respective units of the server 100 in accordance with, for example, the programs stored in the storage device 102 using the memory 103 as a work memory. Note that the programs used by the CPU 101 to operate may be stored in, for example, a ROM (not shown) in advance.

The operation unit 105 receives a user operation, generates a control signal corresponding to the operation, and supplies it to the CPU 101. For example, the operation unit 105 includes, as an input device for receiving the user operation, a character information input device such as a keyboard or a pointing device such as a mouse or a touch panel. The CPU 101 controls the respective units of the server 100 in accordance with a program based on the control signal generated by and supplied from the operation unit 105 in accordance with the user operation performed on the input device. This allows the server 100 to perform an operation corresponding to the user operation.

The display control unit 104 outputs a display signal that causes a display 107 to display an image. For example, a display control signal generated by the CPU 101 in accordance with a program is supplied to the display control unit 104. The display control unit 104 generates a display signal based on the display control signal and outputs it to the display 107. For example, the display control unit 104 causes the display 107 to display a GUI (Graphical User Interface) screen that constitutes a GUI based on the display control signal generated by the CPU 101.

Note that when a touch panel is used as the operation unit 105, the operation unit 105 and the display 107 can be integrated. For example, the touch panel is constituted while preventing its light transmittance from impeding display on the display 107, and attached to the upper layer of the display surface of the display 107. Input coordinates on the touch panel and display coordinates on the display 107 are made to correspond to each other. This enables to constitute a GUI which the user can use as if he/she were directly operating the screen displayed on the display 107.

The drive device 106 reads data from a detachable recording medium such as a CD or a DVD or writes data in the recording medium under the control of the CPU 101. Note that the recording medium the drive device 106 can receive is not limited to a disk recording medium such as a CD or a DVD. The drive device 106 may receive a nonvolatile semiconductor memory such as a memory card. The communication device 109 performs communication with a network (not shown) such as a LAN or the Internet under the control of the CPU 101. Communication with the image capture apparatus is also performed via the communication device 109.

FIG. 2 is a block diagram showing the arrangement of an example of an image capture apparatus 200 according to the embodiment of the present invention. The image capture apparatus 200 can be, for example, a digital camera, of an arbitrary electronic device such as a cellular phone or computer including a digital camera or connectable to a digital camera. Referring to FIG. 2, a CPU 201, a storage device 202, a memory 203, a display control unit 204, an operation unit 205, a drive device 206 capable of receiving a storage medium, a communication device 209, and an image sensor 210 are connected to an internal bus 208. The respective units connected to the internal bus 208 can exchange data with each other via the internal bus 208.

The storage device 202 stores image data, other data, and various kinds of programs used by the CPU 201 to operate. The memory 203 is formed from, for example, a RAM. The CPU 201 that executes display control, calculations, and the like controls the respective units of the image capture apparatus 200 in accordance with, for example, the programs stored in the storage device 202 using the memory 203 as a work memory. Note that the programs used by the CPU 201 to operate may be stored in, for example, a ROM (not shown) in advance. Note that when the image capture apparatus is a digital camera, a nonvolatile memory is often used as the storage device 202.

The operation unit 205 receives a user operation, generates a control signal corresponding to the operation, and supplies it to the CPU 201. For example, the operation unit 205 includes, as an input device for receiving the user operation, a pointing device such as a key switch and a touch panel. The CPU 201 controls the respective units of the image capture apparatus 200 in accordance with a program based on the control signal generated by and supplied from the operation unit 205 in accordance with the user operation performed on the input device. This allows the image capture apparatus 200 to perform an operation corresponding to the user operation. The display control unit 204 outputs a display signal that causes a display 207 serving as the display device of the image capture apparatus 200 to display an image. For example, a display control signal generated by the CPU 201 in accordance with a program is supplied to the display control unit 204. The display control unit 204 generates a display signal based on the display control signal and outputs it to the display 207. For example, the display control unit 204 causes the display 207 to display a GUI (Graphical User Interface) screen that constitutes a GUI based on the display control signal generated by the CPU 201. The display 207 can also function as the EVF of the image capture apparatus.

Note that when a touch panel is used as the operation unit 205, the operation unit 205 and the display 207 can be integrated. For example, the touch panel is constituted while preventing its light transmittance from impeding display on the display 207, and attached to the upper layer of the display surface of the display 207. Input coordinates on the touch panel and display coordinates on the display 207 are made to correspond to each other. This enables to constitute a GUI which the user can use as if he/she were directly operating the screen displayed on the display 207.

The drive device 206 receives a detachable storage medium such as a memory card, and reads data from the received storage medium or writes data under the control of the CPU 201. The communication device 209 performs communication with a network (not shown) such as a LAN or the Internet under the control of the CPU 201. The communication device 209 can be accommodated in the image capture apparatus 200 or constructed as an external apparatus of the image capture apparatus 200. If the communication device 209 is an external apparatus of the image capture apparatus 200, the communication device 209 and the image capture apparatus 200 are assumed to be connected by an adapter or the like or connected via short-distance wireless such as Bluetooth. The image capture apparatus 200 can communicate with the server 100 on the network via the communication device 209.

An optical system 211 has lenses and an aperture function, and guides an optical image to the image sensor 210. A signal from the image sensor 210 is converted into digital data and written in the memory 203 under the control of the CPU 201. The digital data stored in the memory 203 is compressed by the CPU 201 and recorded in the drive device 206 as image data. Parallel to the compression and recording processing, the CPU 201 resizes the digital data accumulated in the memory 203 to an optimum size to generate image data and saves it in the memory 203. The CPU 201 performs recognition processing for the image data and supplies, to the display control unit 204, a display control signal that superimposes additional information such as a frame on the recognized object. The display control unit 204 displays the image under shooting on the display 207 in accordance with the supplied display control signal.

The image capture apparatus 200 of this embodiment shares information about a person to be recognized with another image capture apparatus. Hence, a person registered in the local image capture apparatus as a person to be recognized is also handled as a person to be recognized by the other image capture apparatus that shares the information. Similarly, a person registered in the other image capture apparatus as a person to be recognized is also handled as a person to be recognized by the local image capture apparatus. When a plurality of image capture apparatuses share the information of a person that is to be recognized, it is possible to request a shooting concerning a specific person between the image capture apparatuses.

The image capture apparatus 200 according to this embodiment displays a recognition result that enables to discriminate between persons registered in the local apparatus and those registered in another apparatus. For example, the display form of the color of a face frame or the like that is additional information added to an object is changed. This allows the user to recognize that the person requested to shoot exists in the screen and appropriately cooperate to shoot the person in the screen.

The operation of the image capture apparatus 200 according to this embodiment will be described below. An arrangement for causing another image capture apparatus to share data via the server 100 will be explained below. However, the image capture apparatuses can also share information necessary for person recognition or captured data by direct communication between them. The direct communication between the image capture apparatuses and the communication via the server 100 may be combined. For example, information necessary for person recognition may directly be communicated between the image capture apparatuses, and captured data may be stored using the server 100 as a network storage.

Figure 4:
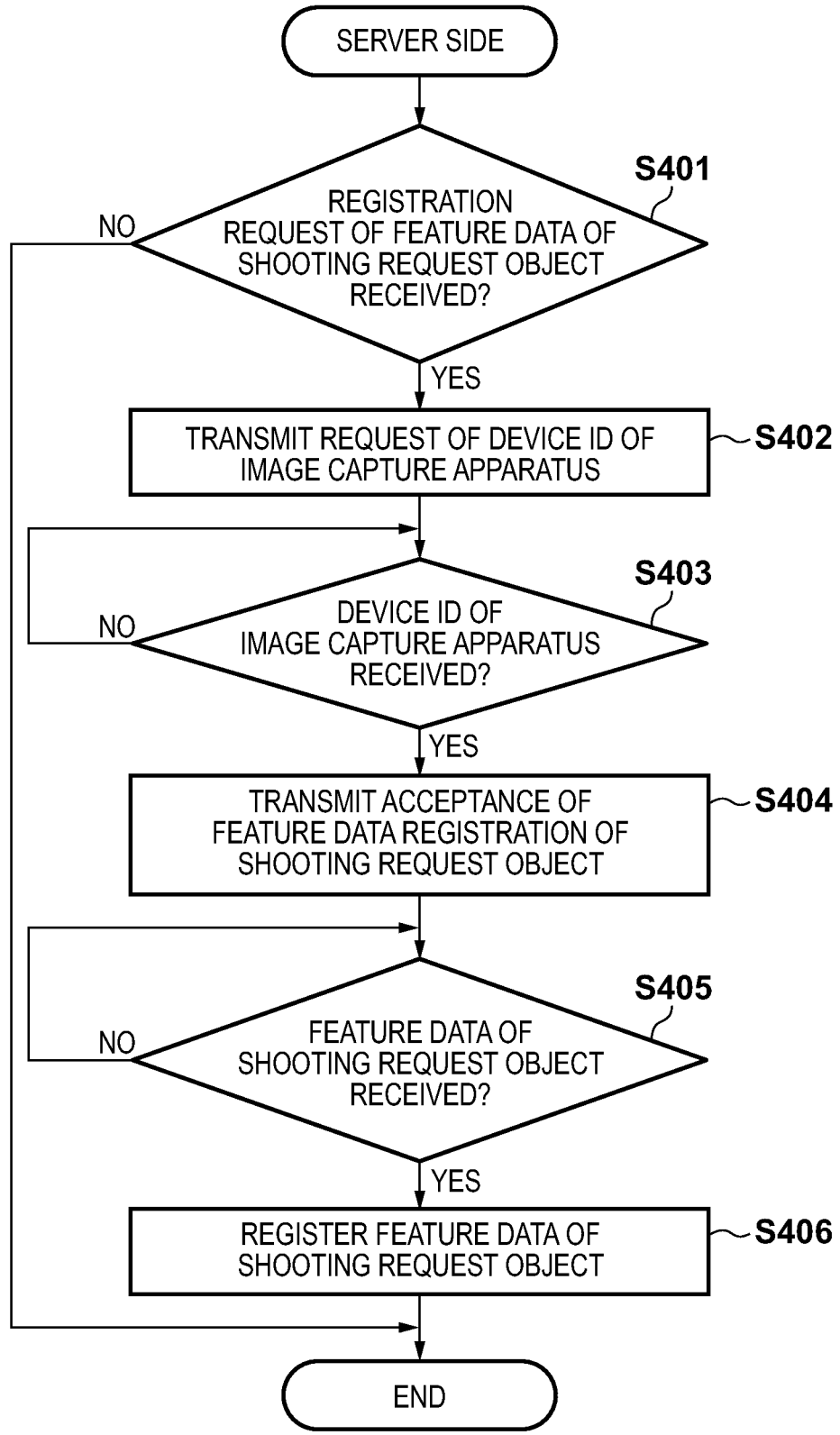
FIG. 4 is a flowchart showing object registration processing.

Processes performed in the image capture apparatus 200 and the server 100 to register, in the server 100, information of an object that is the target for shooting request of the image capture apparatus 200 will be described with reference to the flowcharts of FIGS. 3 and 4. Each process in the flowchart of FIG. 3 is implemented by causing the CPU 201 to expand and execute, on the memory 203, a program stored in the storage device 202. Each process in the flowchart of FIG. 4 is implemented by causing the CPU 101 to expand and execute, on the memory 103, a program stored in the storage device 102.

The processes in the flowchart of FIG. 3 will be described first.

Figure 5:
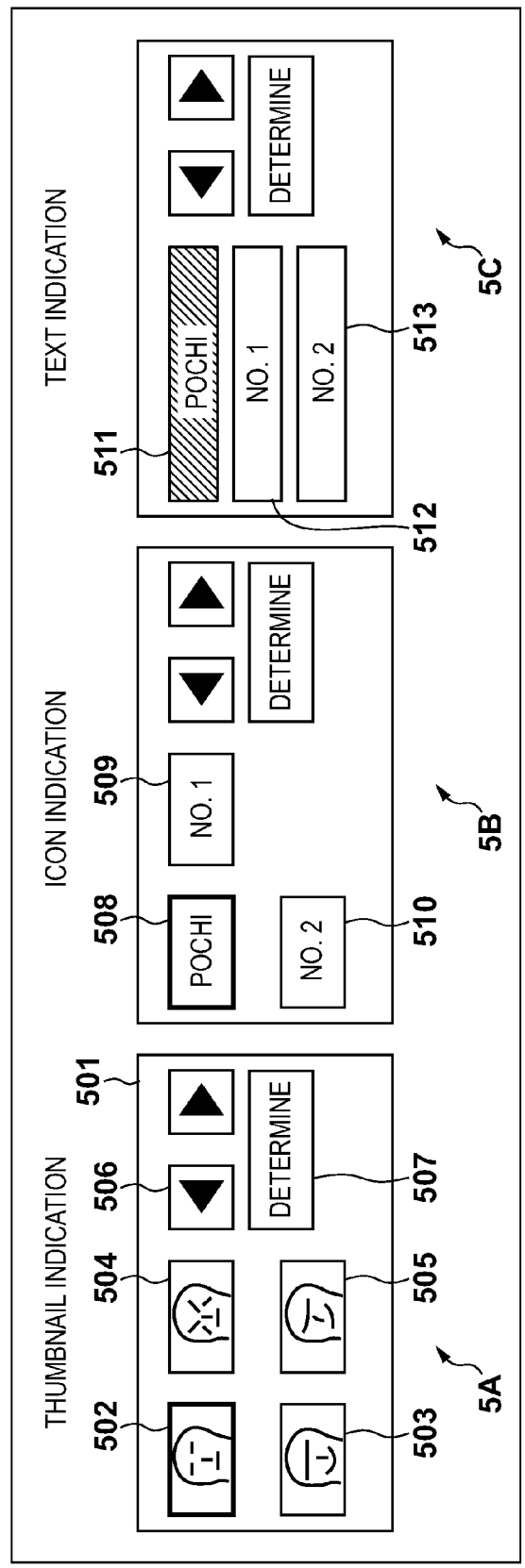
FIG. 5 is a view showing display examples of a display at the time of registration processing.

In step S301, the CPU 201 of the image capture apparatus 200 reads out image data from a storage medium inserted into the drive device 206 of the image capture apparatus 200, recognizes the face of a person included in image data, and sends a display control signal to the display control unit 204 to display the image of the face region as an object. FIG. 5 shows examples of a list screen of objects (person's faces) corresponding to feature data, which is displayed on the display 207 of the image capture apparatus 200. The list screen displays object images as indicated by 5A. Alternatively, the respective objects and their names are associated and stored in the storage device 202 in response to a user operation. Icons representing the objects are displayed, as indicated by 5B, or the names of the objects corresponding to the feature data are displayed in text, as indicated by 5C. The information of an object selected from those displayed in the list screen 400 of the image capture apparatus 200 is transmitted to the server 100. The server 100 saves the information of the object as the shooting request target object. This enables to share the information of the object with another image capture apparatus.

In step S302, the CPU 201 determines whether the operation of selecting the shooting request target object has been done from the operation unit 205. The user of the image capture apparatus 200 can select the shooting request target object in the following way. For example, 5A in FIG. 5 indicates a state in which an image 502 of a selected object and images 503, 504, and 505 of other objects are displayed in a display region 501. The user selects the image of the shooting request target object using a select key 506 and presses a determination key 507. The CPU 201 recognizes that the object corresponding to the image selected by operating the determination key 507 is selected as the shooting request target object. For example, 5B indicates a state in which a selected icon 508 and icon indications 509 and 510 of other objects are displayed. Like 5A, the user can select a shooting target object by selecting an icon corresponding to the desired object using the select key 506 and then operating the determination key 507. In addition, 5C indicates a state in which a selected text 511 and text indications 512 and 513 of other objects are displayed. In this case as well, the user can select a shooting target object by selecting an icon using the select key 506 and then operating the determination key 507. Upon detecting the operation of determining the shooting request target object (the operation of pressing the determination key 507), the CPU 201 advances the process to step S303. If the operation is not detected, the CPU 201 waits for the operation.

In step S303, the CPU 201 transmits a registration request of the shooting request target object to the server 100. In step S304, the CPU 201 receives, from the server 100, a transmission request of identification information (device ID) used to identify the image capture apparatus 200. In step S305, the CPU 201 transmits the device ID of the image capture apparatus 200 to the server 100. The device ID can be, for example, a MAC address capable of uniquely specifying the image capture apparatus 200.

In step S306, the CPU 201 determines whether an acceptance of registration of an object feature data is received from the server 100. If the acceptance is received (YES in step S306), the CPU 201 transmits, to the server 100, feature data used to recognize the object selected in step S302 from an image in step S307. Note that as for the feature data, the CPU 201 recognizes the person's face from image data, analyzes the image of the face region to generate feature data, and stores it in the storage device 202 in advance. Feature data corresponding to the selected object is read out and transmitted to the server 100. Alternatively, after the shooting request target object has been selected in step S302, the CPU 201 may analyze the image of the face region corresponding to the selected object to generate the feature data. Note that when an object name is selected, feature data can be calculated from the image of the face region corresponding to the object name.

The processes in the flowchart of FIG. 4 will be described next.

In step S401, the CPU 101 of the server 100 receives a registration request of the feature data of a shooting request target object from the image capture apparatus 200.

In step S402, the CPU 101 requests the image capture apparatus 200 to transmit the device ID of the image capture apparatus 200. In step S403, the CPU 101 receives the device ID of the image capture apparatus 200 from the image capture apparatus 200.

In step S404, the CPU 101 transmits a registration acceptance of the feature data of the shooting request target object to the image capture apparatus 200. In step S405, the CPU 101 receives the feature data of the object from the image capture apparatus 200. In step S406, the CPU 101 registers the received feature data of the shooting request target object in the storage device 102 and ends the registration processing. At this time, the CPU 101 stores the feature data of the object received from the image capture apparatus 200 in step S405 in the storage device 102 in association with the device ID received in step S402. A shooting request target object corresponding to feature data transmitted from the image capture apparatus 200 to the server 100 will be referred to as a main object in the image capture apparatus 200 hereinafter. On the other hand, a shooting request target object corresponding to feature data transmitted from the other image capture apparatus to the server 100 will be referred to as a sub object in the image capture apparatus 200.

Figure 6:
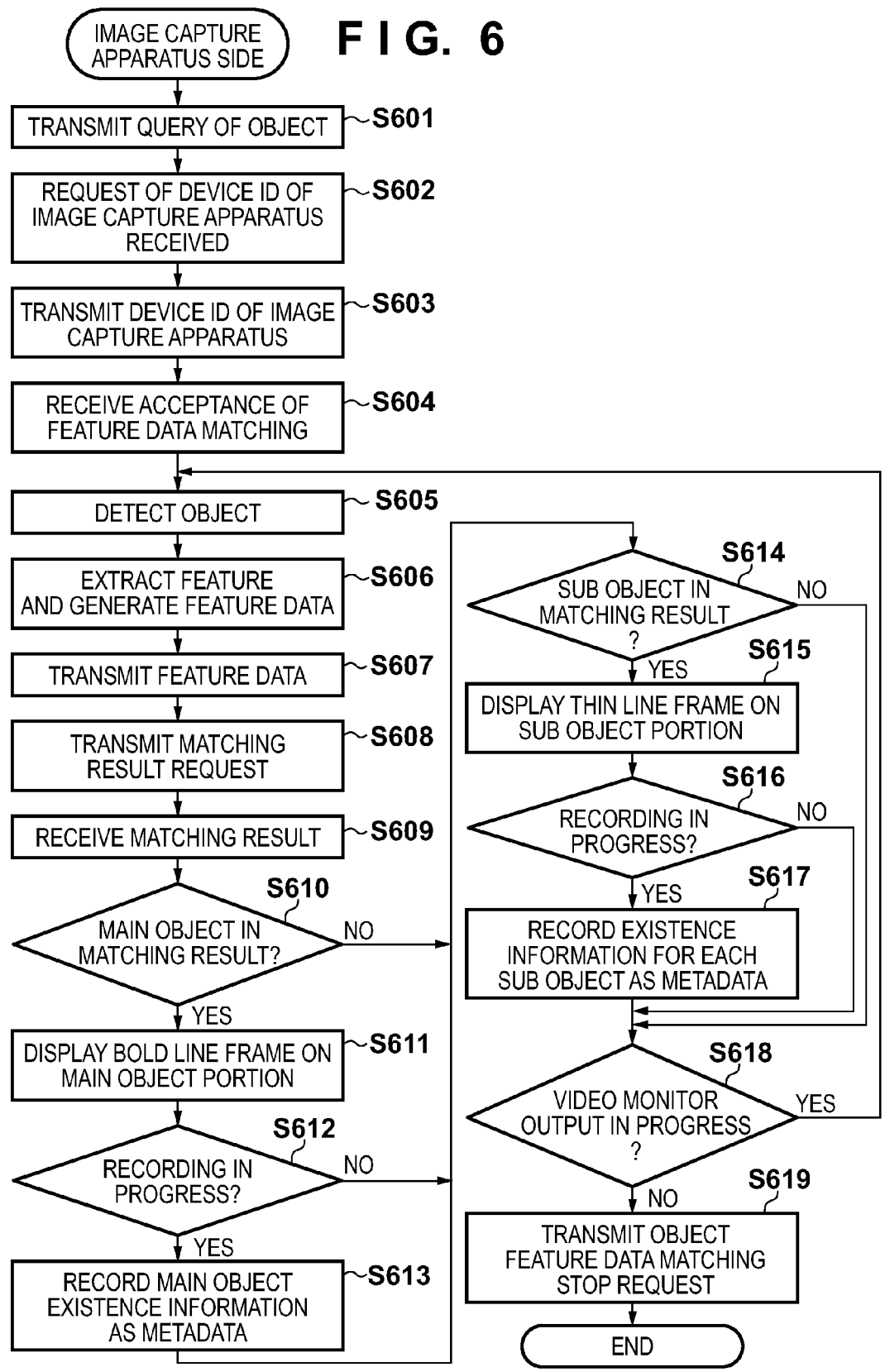
FIG. 6 is a flowchart showing shooting processing.
Figure 7:
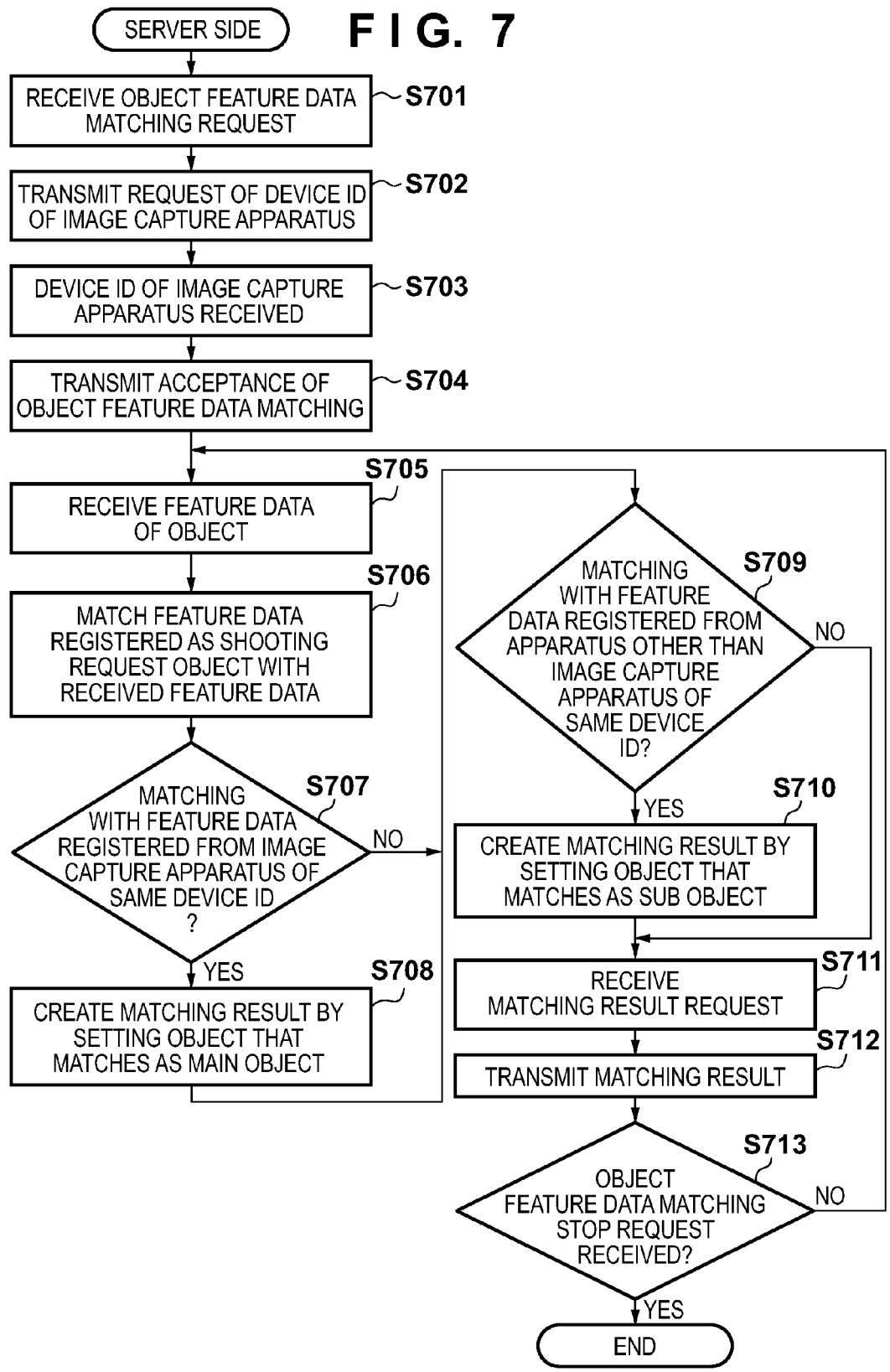
FIG. 7 is a flowchart showing shooting processing.

The operation of the image capture apparatus 200 and the corresponding operation of the server 100 at the time of shooting will be described next with reference to the flowcharts of FIGS. 6 and 7. Each process in the flowchart of FIG. 6 is implemented by causing the CPU 201 of the image capture apparatus 200 to expand and execute, on the memory 203, a program stored in the storage device 202. Each process in the flowchart of FIG. 7 is implemented by causing the CPU 101 of the server 100 to expand and execute, on the memory 103, a program stored in the storage device 102.

The operation of the image capture apparatus 200 will be described first with reference to FIG. 6. Note that the processing shown in FIG. 6 can start periodically or at an arbitrary timing during, for example, shooting processing of the image capture apparatus 200 (during recording processing of a shot image or during EVF display in the shooting standby state).

In step S601, the CPU 201 of the image capture apparatus 200 transmits, to the server 100 via the communication device 209, a query to ask whether image data output from the image sensor 210 and saved in the memory 203 includes a shooting request target object of another image capture apparatus. In step S602, the CPU 201 receives a transmission request of the device ID of the image capture apparatus 200 from the server 100. In step S603, the CPU 201 transmits the device ID of the image capture apparatus 200 to the server 100. In step S604, the CPU 201 receives an acceptance for the query from the server 100.

In step S605, the CPU 201 detects a face region of a person from the image data stored in the memory 203. In step S606, the CPU 201 creates feature data for each detected face region. Note that if a plurality of face regions is detected from the image data, the CPU 201 creates feature data for each of the plurality of face regions. Arbitrary known techniques are usable to detect face regions from image data and extract the feature data of faces, and a description of detailed methods will be omitted. In step S607, the CPU 201 transmits the feature data created in step S606 to the server 100. At this time, the CPU 201 transmits the feature data of each face region to the server 100 in correspondence with its identification information (face ID) in step S607. Upon receiving the feature data, the server 100 matches them with the feature data stored in the storage device 102. This matching is performed not only for the feature data of the main object registered in the image capture apparatus 200 that has transmitted the feature data but also for the feature data of the main object (a sub object for the image capture apparatus 200) registered in the other image capture apparatus. In step S608, the CPU 201 requests the result of matching performed by the server 100 between the feature data of the object included in the image data obtained by the shooting processing of the image capture apparatus 200 and the feature data of the shooting request target object of the other image capture apparatus. In step S609, the CPU 201 receives the matching result from the server 100. The server 100 transmits, as the matching result, a result flag representing at least one of "main object", "sub object", and "unregistered" as the state of the object corresponding to the feature data to the image capture apparatus 200 in association with the face ID.

In step S610, the CPU 201 determines whether the main object exists in the received matching result. If the main object exists, the process advances to step S611. If the main object does not exist, the process advances to step S614. If the main object exists in the matching result, in step S611 the CPU 201 transmits, to the display control unit 204, a display control signal including an instruction to do identification display by, for example, superimposing a bold line frame on the main object portion out of the image data output from the image sensor 210 and saved in the memory 203. As a result, as indicated by 8A of FIG. 8, a bold line frame 803 is superimposed on a main object 802 displayed in a display region 801 on the display 207 of the image capture apparatus 200. This display mode is an example of main object display in the first mode. Note that the CPU 201 saves, in the storage device 202, the feature data and face IDs transmitted in step S607 in correspondence with each other. Using the feature data corresponding to the face ID recognized as the main object in the matching result, recognition processing is applied to the image data saved in the memory 203. As the result of application, the main object portion in the image data can be detected.

Note that as for the main object, in place of the server 100, the image capture apparatus 200 may store the feature data of the main object in the storage device 202 in advance, and perform recognition processing for the image data saved in the memory 203 using the feature data read out from the storage device 202 to detect the main object portion.

In step S612, the CPU 201 determines whether the image data saved in the memory 203 is being recorded in the storage device 202. If the image data is being recorded, the process advances to step S613. If the image data is not being recorded (during pause of recording or in the standby state), the process advances to step S614. In step S613, the CPU 201 records main object existence information representing the existence of the main object in the form of metadata as associated information of the image data, and advances the process to step S614. Hence, when a search is performed after the shooting based on the metadata of the image data, the image data including the main object can be acquired. In particular, if the image data is a moving image, the period during which the main object is included in the image data can be acquired. Note that if the image data is a still image, the main object existence information is recorded in a predetermined region such as the MakerNote region of Exif information. If the image data is a moving image, the main object existence information may be recorded in association with, for example, the number or time code of a frame including the main object. This also applies to a sub object to be described concerning step S617.

In step S614, the CPU 201 determines whether a sub object exists in the received matching result. If a sub object exists, the process advances to step S615. If no sub object exists, the process advances to step S618. If a sub object exists in the matching result, in step S615 the CPU 201 transmits, to the display control unit 204, a display control signal including an instruction to do identification display by, for example, superimposing a thin line frame on a sub object portion out of the image data output from the image sensor 210 and saved in the memory 203. As a result, as indicated by 8A of FIG. 8, a thin line frame 806 is superimposed on each of sub objects 804 and 805 displayed in the display region 801 on the display 207 of the image capture apparatus 200. This display mode is an example of sub object display in the second mode.

For example, 8A of FIG. 8 indicates a state in which the main object 802 on which the bold line frame 803 is superimposed and the sub objects 804 and 805 on which the thin line frames 806 are superimposed are displayed. If the main object does not exist, and only the sub objects exist, the thin line frames 806 are superimposed on the sub objects 805 and 807, as indicated by 8B. If the main object exists, and no sub object exists, the bold line frame 803 is superimposed on the main object 805 on the display 207, as indicated by 8C. No frame is superimposed on an object 808 that is neither the main object not a sub object. This allows the user of the image capture apparatus 200 to intuitively recognize, on the display 207, the existence of not only the main object that he/she is going to shoot but also a sub object requested by the user of another image capture apparatus to shoot. In addition, since frames are displayed to identify the main object and sub objects, the user can shoot by setting the shooting conditions in consideration of the priority orders of the objects.

In step S616, the CPU 201 determines whether the image data saved in the memory 203 is being recorded in the storage device 202. If the image data is being recorded, the process advances to step S617. If the image data is not being recorded, the process advances to step S618. Upon determining that the image data is being recorded, in step S617 the CPU 201 records sub object existence information representing the existence of a sub object as associated information of the image data. Note that if the image data is a moving image, the sub object existence information includes information representing the period where the sub object is included in the image data as well. When the image data is a moving image, the period where the sub object is recorded can be discriminated by performing a search based on the metadata.

In step S618, the CPU 201 determines whether the display control signal is being displayed on the display 207. For example, during shooting processing, the display 207 is functioning as the EVF. Hence, the CPU 201 determines that monitor output is progressing. If display is not being performed (NO in step S618), the CPU 201 transmits a query stop request to the server 100 in step S619, and ends the processing.

As described above, even during the time in which the image data is not being recorded in the storage device 202, the CPU 201 identifiably displays the main object and sub objects when the image from the image sensor 210 is being displayed on the display 207 as a monitor output.

The processing of the server 100 will be described next with reference to FIG. 7. In step S701, the CPU 101 receives a query from the image capture apparatus 200.

In step S702, the CPU 101 requests the image capture apparatus 200 to send its device ID. In step S703, the CPU 101 receives the device ID of the image capture apparatus 200 from the image capture apparatus 200.

In step S704, the CPU 101 transmits an acceptance for the query to the image capture apparatus 200. In step S705, the CPU 101 receives the feature data of objects in the image under shooting and associated face IDs from the image capture apparatus 200.

In step S706, the CPU 101 matches the feature data of the shooting request target object stored in the storage device 102 in step S406 with the feature data of the objects under shooting by the image capture apparatus 200, which are received in step S705. In step S707, the CPU 101 determines whether the feature data received from the image capture apparatus 200 in step S705 include data that matches the feature data stored in the storage device 102 in association with a device ID identical to the device ID received in step S703. If matching feature data exists, the CPU 101 advances the process to step S708. If no matching feature data exists, the CPU 101 advances the process to step S709. In step S708, the CPU 101 records a result flag representing that the object corresponding to the matching feature data is the "main object" in the matching result in association with the face ID corresponding to the feature data. Note that "match" need not always mean complete match, and also includes a case in which the degree of matching is so high that it can be estimated that the possibility that the objects are identical is sufficiently high.

In step S709, the CPU 101 determines whether the feature data received from the image capture apparatus 200 in step S705 include data that matches the feature data stored in the storage device 102 in association with a device ID other than the device ID received in step S703. If matching feature data exists, the CPU 101 advances the process to step S710. If no matching feature data exists, the CPU 101 advances the process to step S711. In step S710, the CPU 101 records a result flag representing that the object corresponding to the matching feature data is a "sub object" in the matching result in association with the face ID corresponding to the feature data. In step S711, the CPU 101 receives an object matching result request from the image capture apparatus 200. In step S712, the CPU 101 transmits the matching result to the image capture apparatus 200.

In step S713, the CPU 101 determines whether an object feature data matching stop request is received from the image capture apparatus 200. If the request is received, the processing ends. If the request is not received, the process returns to step S705 to continue the processing.

The operation of causing the image capture apparatus 200 to provide image data including a sub object to the server 100 and the corresponding operation of the server 100 will be described next with reference to the flowcharts of FIGS. 9 and 10. Each process in the flowchart of FIG. 9 is implemented by causing the CPU 201 of the image capture apparatus 200 to expand and execute, on the memory 203, a program stored in the storage device 202. Each process in the flowchart of FIG. 10 is implemented by causing the CPU 101 of the server 100 to expand and execute, on the memory 103, a program stored in the storage device 102.

The operation of the image capture apparatus 200 will be described first with reference to FIG. 9.

In step S901, the CPU 201 transmits a request for collecting an image data to the server 100. In step S902, the CPU 201 receives a transmission request of the device ID of the image capture apparatus 200 from the server 100.

In step S903, the CPU 201 transmits the device ID of the image capture apparatus 200 to the server 100. In step S904, the CPU 201 receives an acceptance of collecting image data from the server 100.

In step S905, the CPU 201 searches the image data stored in the storage device 202 for image data including sub object existence information in metadata, and transmits image data in which a sub object exists to the server 100. Note that the image data transmitted here can be part of image data only in the period represented by the metadata including the sub object existence information or whole image data having the period. For example, if the sub object is included only in several periods of a 10-min moving image, the whole 10-min image can be transmitted. Alternatively, only the periods with the sub object may be extracted and transmitted. Note that a plurality of image data may be transmitted together except when collecting image data in every shooting as in a case in which the image capture apparatus 200 requests the server 100 to collect image data at the end of every shooting. For this reason, the image capture apparatus 200 can add information representing whether image data has already been transmitted to the server 100 to each image data including the sub object and record the image data.

In step S905, the CPU 201 may send, to the display control unit 204, a display control signal to display the found image data on the display 207 so as to display a list of found image data before transmission to the server 100. In step S905, image data may be selected from the displayed list and transmitted to the server 100 in response to a user operation. This makes it possible to prevent any other user from acquiring image data that includes a sub object but should not be shared.

The operation of the server 100 will be described next with reference to FIG. 10. In step S1001, the CPU 101 receives a request for collecting an image data from the image capture apparatus 200. In step S1002, the CPU 101 transmits, to the image capture apparatus 200, a transmission request of its device ID.

In step S1003, the CPU 101 receives the device ID of the image capture apparatus 200 from the image capture apparatus 200. When the device ID is received in step S1003, the image capture apparatus that has shot the collected image data can be specified.

In step S1004, the CPU 101 transmits an acceptance of collecting image data to the image capture apparatus 200. In step S1005, the CPU 101 receives sub object image data from the image capture apparatus 200.

In step S1006, the CPU 101 saves the sub object image data (shooting cooperation image) received in step S1005 in the storage device 102. In step S1006, the CPU 101 refers to sub object existence information in metadata associated with the image data of the moving image out of the shooting cooperation image, extracts a period including the sub object from the image data, and saves it in the storage device 102 as a shooting cooperation image. In step S1007, the CPU 101 classifies the shooting cooperation images saved in step S1006 by the device ID. More specifically, the CPU 101 detects a face region of a person from each shooting cooperation image and generates feature data for each detected face region. Next, the CPU 101 acquires a device ID associated with the feature data of the shooting request target object stored in the storage device 102 in step S406, which matches the generated feature data. The acquired device ID is associated with the shooting cooperation image and stored in the storage device 102. This classification processing is executed for all shooting cooperation images received in step S1005.

Processing of distributing image data shot by the image capture apparatus 200 as a sub object and collected by the server 100 will be described below with reference to FIGS. 12 and 13.

The operation of the image capture apparatus 200 will be described first with reference to FIG. 12. In step S1201, the CPU 201 of the image capture apparatus 200 transmits a shooting cooperation image distribution request to the server 100. In step S1202, the CPU 201 receives a request of the device ID of the image capture apparatus 200 from the server 100.

In step S1203, the CPU 201 transmits the device ID of the image capture apparatus 200 to the server 100. In step S1204, the CPU 201 receives shooting cooperation images from the server 100. In step S1205, the CPU 201 saves the received shooting cooperation images in the storage device 202, and ends the processing.

Note that in step S1204, the CPU 201 may receive the thumbnails of shooting cooperation images from the server 100 and send a display control signal to display the thumbnails on the display 207 to the display control unit 204 to display a list of shooting cooperation images before shooting cooperation image reception from the server 100. The CPU 201 may select a thumbnail from the displayed list in response to a user operation, request the server 100 to transmit a shooting cooperation image corresponding to the selected thumbnail, and receive the shooting cooperation image in step S1204. This makes it possible to prevent the apparatus from acquiring image data that is unnecessary, although including the sub object.

The operation of the server 100 will be described next with reference to FIG. 13. In step S1301, the CPU 101 receives a shooting cooperation image distribution request from the image capture apparatus 200. In step S1302, the CPU 101 transmits a request of the device ID of the image capture apparatus 200 to the image capture apparatus 200. In step S1303, the CPU 101 receives the device ID of the image capture apparatus from the image capture apparatus 200.

In step S1304, the CPU 101 transmits shooting cooperation images corresponding to the device ID received in step S1303 to the image capture apparatus 200, and ends the processing. The server 100 can thus extract image data including an object that is the main object for the image capture apparatus 200 that has requested the distribution for image data shot as a sub object by another image capture apparatus and provide the image data.

FIG. 11 shows examples of images obtained by causing a plurality of image capture apparatuses 200 to do shooting at the same event. Images 11A to 11K are shot by the different image capture apparatuses 200.

Assume that in the image capture apparatus 200 that has shot the image 11A, the main object is the object 802, and the sub objects are the objects 804 and 805. In this case, if an image (for example, image 11E) including the object 802 and shot by another image capture apparatus has been uploaded to the server 100, the user of the image capture apparatus can download it from the server 100. The user of the image capture apparatus 200 can thus acquire the desired image he/she could not shoot. In addition, the image capture apparatus 200 can distribute the image 11A to the user of another image capture apparatus, for which the sub object 804 or 805 is the main object, by uploading the image to the server.

Similarly, assume that in the image capture apparatus 200 that has shot the image 11B, the main object is the object 804, and the sub objects are the objects 805 and 806. In this case, if an image (for example, image 11F or 11J) including the object 804 and shot by another image capture apparatus has been uploaded to the server 100, the user of the image capture apparatus can download it from the server 100.

Assume that in the image capture apparatus that has shot the image 11C, the main object is the object 805, and the sub object is the object 802. In this case, if an image (for example, image 11G or 11K) including the object 805 and shot by another image capture apparatus has been uploaded to the server, the user of the image capture apparatus can download it from the server 100.

Also assume that in the image capture apparatus that has shot the image 11D, the main object is the object 806, and the sub object is the object 804. In this case, if an image (for example, image 11H) including the object 806 and shot by another image capture apparatus has been uploaded to the server, the user of the image capture apparatus can download it from the server 100.

As described above, when the shooting request target object of another image capture apparatus is included in a shot image, the image capture apparatus 200 according to this embodiment displays the image on the monitor so as to discriminate the object. For this reason, even if the object is unknown by the user of the image capture apparatus 200, he/she can know that another user wishes to shoot this object. Hence, the user can easily cooperate with the user of the other image capture apparatus in shooting.

Additionally, even a user who cannot contact another user in advance can be notified of the shooting request target object of the other user. Hence, the other user can easily request the cooperation in shooting.

Furthermore, the shooting cooperation images need only be transmitted to the server 100 irrespective of the image capture apparatus whose user has sent a request. It is therefore unnecessary to individually communicate with the other user, and the operability is improved.

The other user who has requested shooting can receive the shooting cooperation images only by communicating with the server 100 irrespective of the image capture apparatus which has shot the images. It is therefore unnecessary to individually communicate with the user, and the operability is improved.

Note that a case in which the image capture apparatus 200 communicates with the server 100 has been described above. However, instead of the image capture apparatus 200, an information processing apparatus such as a PC (Personal Computer) owned by an individual may communicate with the server.

In place of the above-described device ID of the image capture apparatus 200, a user ID and password issued to the user of the image capture apparatus 200 in advance by the server 100 may be used. This allows to set the main object for each user even if a plurality of users uses the image capture apparatus 200 and improve the usability.

A case in which the image capture apparatus 200 transmits the feature data to the server 100 has been described above. However, not the feature data but image data may be transmitted to the server 100. In this case, the server 100 generates feature data from the image data received from the image capture apparatus 200 and uses it in subsequent processing. The feature data may be generated from the region of an object existing in a predetermined range out of the image data or an object having a size equal to or larger than a predetermined size out of the image data. This allows to prevent, for example, image data including an object at its edge or image data including an object of a small size from being shared.

Second Embodiment

In this embodiment, a case will be explained in which an image capture apparatus 200 performs shooting processing under an optimum shooting condition for a main object or a sub object. A description of the same portions as in the first embodiment will be omitted, and portions unique to the this embodiment will be described in detail.

Figure 14A:
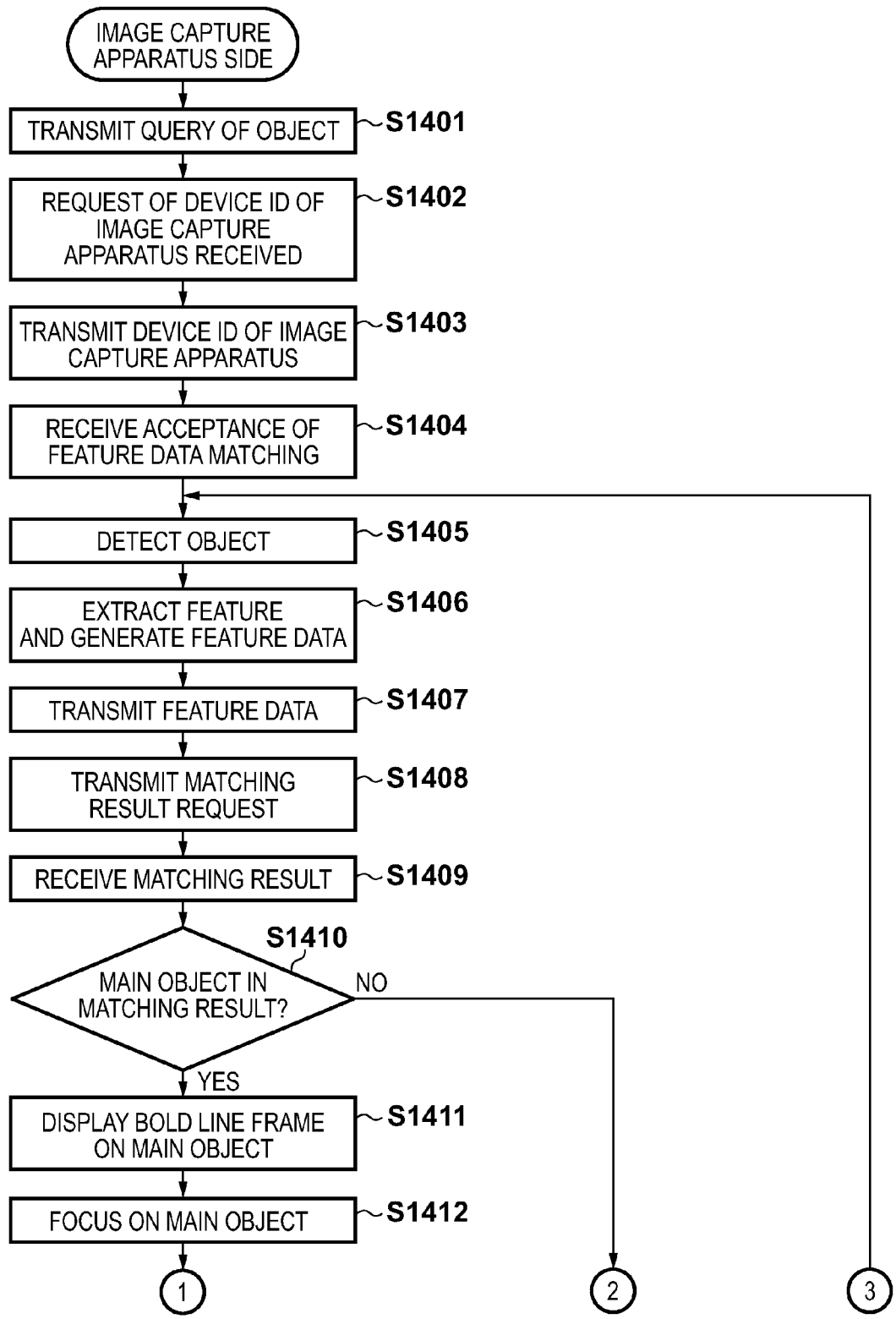
FIGS. 14A and 14B are flowcharts showing the operation of the image capture apparatus at the time of shooting.
Figure 14B:
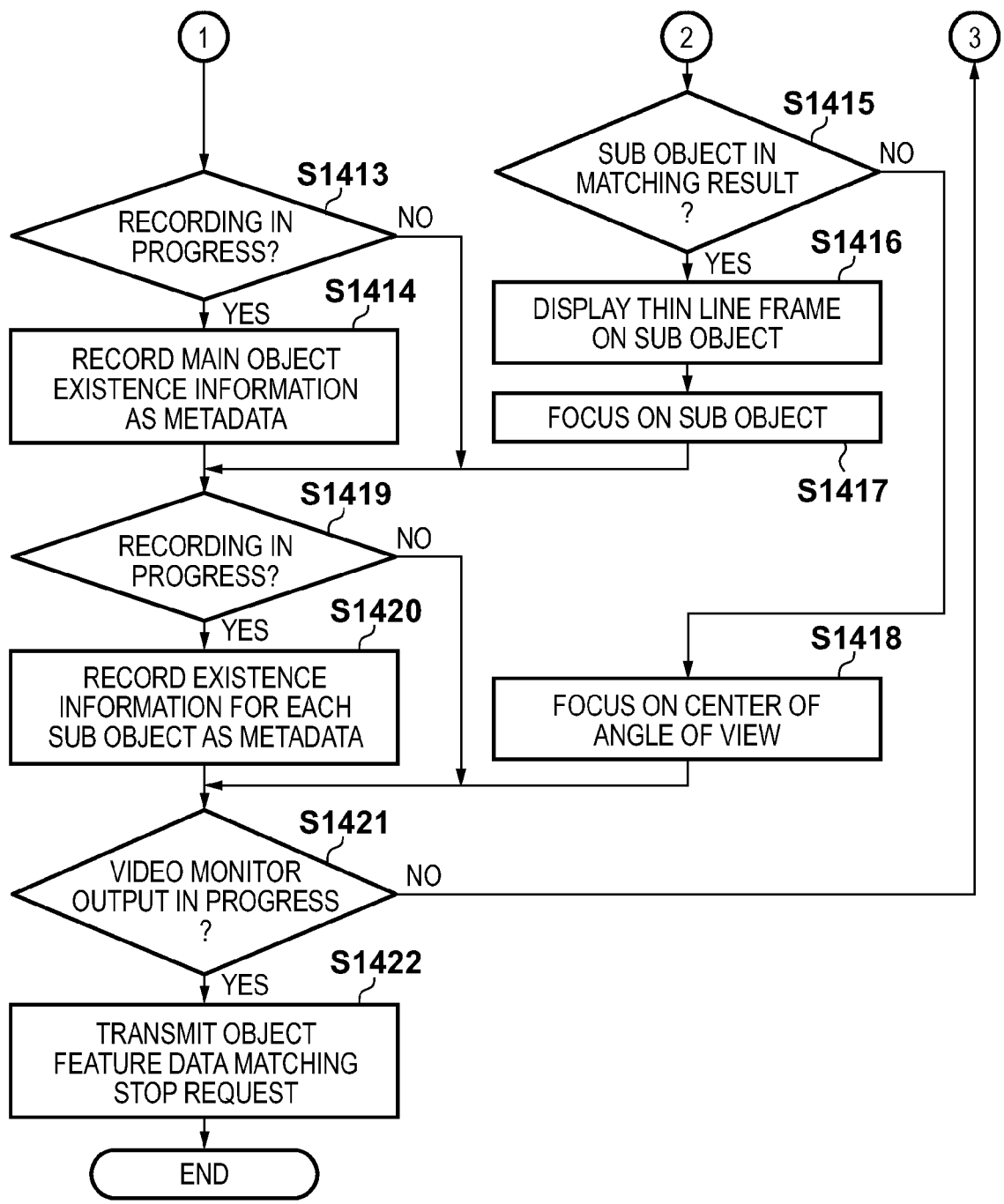

The operation of the image capture apparatus 200 at the time of image capture will be explained with reference to the flowcharts of FIGS. 14A and 14B.

Upon determining that the main object exists in image data (YES in step S1410), a CPU 201 sets focus and exposure in accordance with the state of the main object region and executes shooting processing in step S1412. Note that in addition to the focus and exposure, the main object may be set as the target of tracking, or the color temperature may be adjusted and set.

On the other hand, upon determining that the main object does not exist in the image data (NO in step S1410), the CPU 201 determines in step S1415 whether a sub object exists in the image data. Upon determining that a sub object exists (YES in step S1415), the CPU 201 sets focus and exposure in accordance with the state of the sub object region and executes shooting processing in step S1417. In this case as well, the sub object may the set as the target of tracking, or the color temperature may be adjusted and set.

Note that upon determining that neither the main object nor a sub object exist in the image data (NO in step S1415), the CPU 201 sets focus and exposure in accordance with the state of a predetermined region, for example, the center region and executes shooting processing in step S1418.

According to this embodiment, if the main object is not included, optimum shooting processing is executed in accordance with a sub object. This enables to provide image data of higher quality to another user. In addition, appropriate processing such as focus detection for an object as described in this embodiment may be executed in the first embodiment.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the step S of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-005658 filed Jan. 13, 2012 and 2012-275105 filed Dec. 17, 2012, which are hereby incorporated by reference herein in their entirety.

What is claimed is:

1. An image capture apparatus comprising:
   a memory that stores program instructions;
   at least one processor that executes the instructions stored in the memory,
   wherein the instructions cause, when executed, the at least one processor to implement functions of a transmission unit, a reception unit, storage unit, a matching unit, and a display unit:
   the transmission unit for transmitting first feature data concerning a specified region included in an image captured by an image sensor to an external apparatus;
   the reception unit for receiving a matching result, from the external apparatus, between the first feature data and second feature data concerning a sub object stored in the external apparatus associated with the other image capture apparatus;
   the storage unit for storing third feature data concerning a main object in a predetermined storage area in advance;
   the matching unit for matching the first feature data with the third feature data; and
   the display unit for displaying identifiably, on a display device, a region where there is a sub object in the image based on the matching result received by the reception unit and a region where there is a main object in the image based on the matching result obtained by the matching unit.

2. The apparatus according to claim 1,
   wherein the transmission unit transmits one of the captured image, a face image extracted from the captured image or a feature amount calculated from the face image to the external apparatus as the first feature data.

3. The apparatus according to claim 1, wherein the memory further stores instructions to cause the at least one processor to implement functions of a recording unit:

the recording unit for, when the specified region recognized as the sub object in the matching result received by the reception unit exists in the captured image, recording the captured image in a recording medium in association with sub object existence information representing existence of the sub object.

4. The apparatus according to claim 3, wherein the memory further stores instructions to cause the at least one processor to implement functions of an upload unit:

the upload unit for uploading, to the external apparatus, the image with which the sub object existence information is associated by the recording unit.

5. The apparatus according to claim 1, wherein the memory further stores instructions to cause the at least one processor to implement functions of a setting unit:

the setting unit for, when the specified region recognized as the main object in the matching result obtained by the matching unit does not exist in the captured image, setting a shooting condition to automatically execute at least one of focus detection, exposure, color temperature, and tracking for the specified region recognized as the sub object in the matching result received by the reception unit.

6. A control method of an image capture apparatus, comprising:

transmitting first feature data concerning a specified region included in an image captured by an image sensor to an external apparatus;

receiving a matching result, from the external apparatus, between the first feature data and second feature data concerning a sub object stored in the external apparatus associated with the other image capture apparatus;

storing third feature data concerning a main object in a predetermined storage area in advance;

matching the first feature data with the third feature data; and displaying identifiably, on a display device, a region where there is a sub object in the image based on the matching result received by said reception and a region where there is a main object in the image based on a matching result obtained by said receiving.

7. A non-transitory computer readable recording medium recording a computer program that causes a computer to execute each step of a control method of an image capture apparatus described in claim 6.

* * * * *